United States Patent [19]
Witt

[11] 4,106,217
[45] Aug. 15, 1978

[54] HEAD MOUNTED FLIGHT TRAINING APPARATUS

[76] Inventor: Frank A. Witt, Rte. #4, Hidden Acres, Lexington, S.C. 29072

[21] Appl. No.: 768,941

[22] Filed: Feb. 15, 1977

Related U.S. Application Data

[63] Continuation-in-part of Ser. No. 659,906, Feb. 20, 1976, Pat. No. 4,021,935.

[51] Int. Cl.² ............................................. G09B 9/08
[52] U.S. Cl. ...................................... 35/12 B; 2/432; 35/12 G; 350/332
[58] Field of Search ................ 35/12 B, 12 G, 12 N; 2/2, 6, 8, 12, 432; 340/228 S; 40/52 R, 130 L; 350/160 LC; 273/183 B

[56] References Cited

U.S. PATENT DOCUMENTS

| | | | |
|---|---|---|---|
| 3,111,675 | 11/1963 | Mora | 2/432 |
| 3,281,965 | 11/1966 | Irwin | 35/12 B |
| 3,287,828 | 11/1966 | Cumming | 35/12 B |
| 3,342,540 | 9/1967 | Abeggi et al. | 2/432 X |
| 3,436,840 | 4/1969 | Noxon | 35/12 B |
| 3,873,804 | 3/1975 | Gordon | 2/8 X |
| 3,942,270 | 3/1976 | Hoyt et al. | 35/12 N |
| 3,989,355 | 11/1976 | Wilmer | 350/160 LC |
| 4,011,002 | 3/1977 | Ebihara et al. | 350/160 LC |
| 4,039,803 | 8/1977 | Harsch | 2/8 X |

OTHER PUBLICATIONS

Dobbins, J. P., "Variable-Transmittance Visor for Helmet-Mounted Display", Oct. 1973.

Primary Examiner—Richard C. Pinkham
Assistant Examiner—Vance Y. Hum
Attorney, Agent, or Firm—Allegretti, Newitt, Witcoff & McAndrews

[57] ABSTRACT

Instrument flight training glasses including a voltage controlled, liquid crystal lens system having upper and lower contiguous lens systems independently operable with respect to each other, for limiting a pilot's vision to the instrument control panel of his aircraft when so desired. The lens systems are opacity variable for simulating flight through particular weather and cloud conditions while providing instant clearing of the lower lens system as the pilot views the aircraft control panel. During a landing approach an interlock system is manually actuable to prevent opaque obscuring of the lens system.

15 Claims, 3 Drawing Figures

U.S. Patent  Aug. 15, 1978  4,106,217
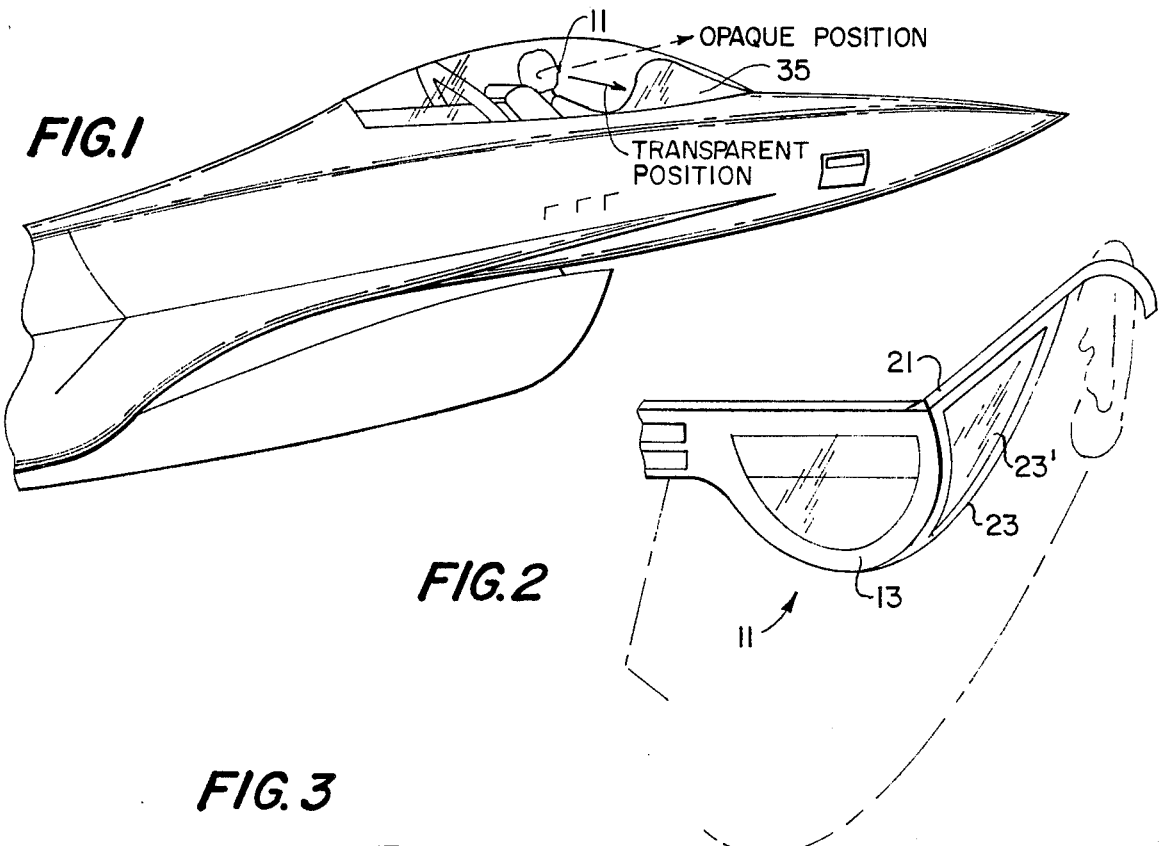
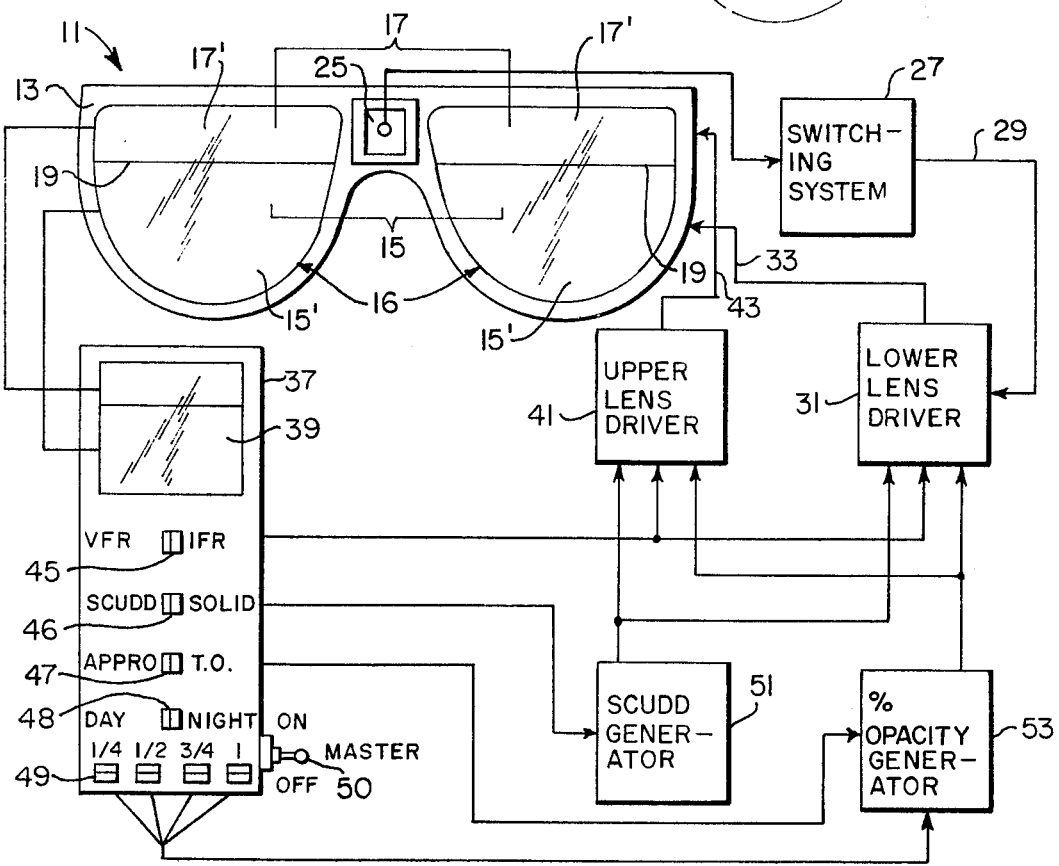

HEAD MOUNTED FLIGHT TRAINING APPARATUS

CROSS REFERENCE TO RELATED APPLICATIONS

This application is a continuation-in-part of a prior U.S. Pat. application, Ser. No. 659,906, filed Feb. 20, 1976, now U.S. Pat. No. 4,021,935 and entitled FLIGHT TRAINING HOOD.

The method and apparatus of the present invention may be utilized, for example, in the flight glasses as disclosed in U.S. patent application, Ser. No. 768,851 filed by Frank A. Witt, III on even date with the present application, and entitled FLIGHT TRAINING METHOD AND APPARATUS; which application is incorporated herein by reference.

BACKGROUND OF THE INVENTION

1. Field of the Invention

The invention relates to aircraft flight training, and more particularly to a pair of flight glasses operable for simulating weather conditions.

2. Description of the Prior Art

In the area of inflight training, a student pilot must be trained to fly blind in bad weather. Pilots are required to have a minimum number of hours of flight instruction under simulated blind flying conditions before receiving a private or commercial license, or instruction rating or military rating to fly aircraft. Such training is a necessity to pilots who plan to, or suddenly or inadvertently, fly into bad weather conditions.

Flight training hoods, goggles, glasses, and the like, have been designed to limit the wearer's field of view to only the instrument panel and immediate cockpit area. Such view limiting devices generally include elongated structures surrounding the pilot's line of vision for constriction thereof, blocking side and upper peripheral sight. Such flight hoods do not provide any method for simulating bad weather conditions and are only used to constrict the pilot's vision to the instrument panel.

Also, such flight hoods not not totally enclose or mask the wearer's line of vision in order to provide a safety factor which insures that the pilot can direct his vision outside the craft in the case of an emergency. However, to accomplish this factor, the hood's elongated structure extending in front of the operator's face becomes awkward and clumsy during flight and may cause eye straining or neck fatigue to support such apparatus. Also, the instructor must depend upon the wearer's trustworthiness during a testing and learning situation to purposefully keep his head substantially level so that the outside references are not in view.

Also, where the pilot inadvertently views outside of the aircraft, he would transition to VFR (visual flight rules) and must immediately transition back to IFR (instrument flight rules) as he looks back into the aircraft. This causes a disorientation to the pilot, promoting a time delay factor due to transition reorientation time. This psychological-type problem occurs with inadvertent viewing using the above-mentioned prior art devices.

Lens fogging-type devices have been considered in the flight hood art, but for the purpose of providing a visual contrast of a CRT display projected on the inside of a pilot's helmet. However, bi-state, lens fogging devices having a completely occluded vision state have not been considered nor utilized in the flight hood art because of a lack of mode of operation therein and because of the previously mentioned safety factor. Although such lens devices have been utilized in helmet-type gear, the functioning of such devices are not compliant to the flight training hood art. Such devices in other arts are responsive to a bright flash of light that occurs during wearer viewing. However, in the flight training environment all stimuli including the ambient light in the cockpit are constant, having no apparent abrupt stimulus occurring at the time the desired fogging should take place.

Therefore, it would be highly desirable to provide flight training glasses having the ease and convenience of an unawkward structure including the quickness of an automatic lens system in which the lens would instantaneously operate in relation to the wear's positioning of his line of vision, and to utilize such glasses to simulate weather and cloud conditions.

SUMMARY OF THE INVENTION

It is therefore an object of this invention to provide an apparatus for flight training in which the pilot is permitted to view the instrument control panel of his aircraft during flight and prevented from viewing outside of the craft as the pilot changes his vision away from the control panel.

It is a further object of this invention to provide flight training glasses having a bistable lens system operable to a state of transparency as the pilot views the instrument control panel of his aircraft and instantaneously operable to a state of vision occlusion responsive to the pilot switching his vision to outside of the aircraft.

It is a further object of this invention to provide maintenance of lens transparency in the case of emergency or necessary viewing for overriding the lens control system.

It is a further object of this invention to provide flight training glasses capable of simulating particular weather conditions while providing a state of transparency whenever the pilot views the instrument control panel of his aircraft.

It is yet another object of this invention to provide a pair of flight training glasses that are operable to a mode permitting normal eye viewing by the pilot.

It is yet another object of this invention to provide an apparatus for locking such training glasses in a mode that permits normal eye viewing by the wearer.

The objectives of this invention are accomplished in a pair of glasses having voltage controlled upper and lower lens systems disposed transverse to the line of wearer's vision, being operable to a state of transparency and obscurable to various vision affecting modes. The relative position of the lens systems with respect to the aircraft windshield is monitored for switching the lower lens system to a transparent state when the wearer is viewing the instrument control panel.

Other objects, features and advantages of the invention will be readily apparent from the following description of the preferred embodiment taken in conjunction with the appended claims, and accompanying drawings.

BRIEF DESCRIPTION OF THE DRAWINGS

FIG. 1 is an illustration of a pilot utilizing the flight training glasses of the present invention.

FIG. 2 is a partial perspective view of the flight glasses of the present invention.

FIG. 3 is a block diagram of the control circuitry of the present invention.

DESCRIPTION OF THE PREFERRED EMBODIMENT

As illustrated in FIG. 1, the preferred flight glasses embodiment of the present invention includes a pair of flight glasses 11 formed in the shape of a pair of regular eyeglasses for use by a pilot during actual aircraft operation. As shown in FIG. 3, the glasses 11 have a frontal piece 13 for housing a lens system comprising a pair of lenses 16 each formed from a liquid crystal and positioned for proper viewing therethrough by the wearer.

Liquid crystals are well-known devices which are variable in light transmissivity dependent upon the magnitude of a voltage level applied thereacross, and may be instantaneously switched from a light transmissive state to a light obscuring state upon the application of a sufficient voltage level. The liquid crystal lenses 16 are maintained in a transparent state until a prefixed voltage is applied thereto, whereby the lenses instantaneously change states in the area of voltage application providing opaqueness to the lenses preventing the pilot from seeing therethrough.

Each of the lenses 16 form two operative lens systems, an upper lens system 17 formed of the upper lens portions 17' of the lenses 16, and a lower lens system 15 formed of the lower lens portions 15' of the lenses 16. The upper lens portions 17' are connected in parallel for conjoint operation, as are the lower lens portions 15'.

Separate transparent electrodes are formed over each of the lower and upper lens portions 15', 17' of each lens 16 to provide independent operation of the lower and upper lens systems with respect to each other. The lens portions 15', 17' are contiguous to one another providing a boundary line 19 therebetween.

The upper lens system 17 is operable to an opaque state by a voltage application to the transparent electrodes formed over the lens portions 17'. In an opaque state, the upper lens system 17 checks the wearer's upper peripheral vision to a predetermined line of sight defined by the line 19, preventing the wearer from viewing higher without a corresponding upward movement of the wearer's head. The opaque state of the lens system 17 operates to discontinue upward eyeball rotation at a certain eyeball position and to engage movement of the operator's neck for further continuous eye searching.

Referring to FIG. 2, side supporting arms 21 are hinged or otherwise secured to the frontal piece 13 and shaped to extend back along the sides of the wearer's head and over the top of wearer's ears for holding the glasses into position during wearing. The glasses are to be held snugly against the wearer's nose in order to prevent the wearer from viewing out over the top of the glasses, and may be further molded to fit snugly if so desired.

Side blinders 23 depend from the support arms 21 along the outside of the wearer's eyes and are positioned for blocking the wearer's side peripheral vision. Each side blinder 23 is formed form a liquid crystal lens 23' to provide side vision occlusion upon the application of a voltage level thereto, and may be permitted to clear at other times when so desired by removing the voltage application.

The particular head gear configuration may take on other forms as may suggest themselves to those skilled in the art, in which a split viewing lens having an upper and lower lens system is positioned transverse to the wearer's line of sight permitting a visual communication through the viewing lens. However, it should be appreciated that this particular embodiment of the invention provides original features and is particularly useful in the disclosed structure of a pair of light-weight eyeglasses.

A position sensor 25 (FIG. 3) is operatively located on the glasses 11 with respect to the horizontal line 19 and operational to indicate the relative position of the flight glasses 11 with respect to the possible upper lines of sight of the wearer when the upper lens system 17 is opaque. The position sensor 25 signals a switching system 27 to actuate the lower lens system 15 to its opaque state when the flight glasses are in a position to permit the operator to view outside the aircraft along his upper line of sight defined by the horizontal line 19.

The position sensor 25 operates in a manner similar to the position sensors described in the above-referenced related applications, the description of which is incorporated herein by reference. The sensor 25 produces at least one voltage wavefom output for inspection by the switching system 27 which produces an output along line 29 to a LOWER LENS DRIVER 31.

With the flight glasses in a position to permit the pilot to view outside the craft along his upper line of sight, a first level output is produced by the switching system 27 along line 29 for commanding the lower lens system 15 to switch to its opaque state. The LOWER LENS DRIVER 31 responds to the first level output along line 29 by applying an appropriate voltage waveform across the lower lens system to instantaneously switch the same to its opaque state. With the glasses in a position to only permit the pilot's eyes to be directed to the control panel of his aircraft, a second level output (whether ground or otherwise) is produced along line 29 to the LOWER LENS DRIVER 31. The lower lens system is kept in its transparent state with a second level output along line 29.

The LOWER LENS DRIVER 31 includes a voltage wave forming network which is connectable to an output line 33 for impressing the necessary voltage waveform (a state-switching waveform) onto the lower lens portions 15' for actuation thereof to their opaque state upon receipt of a first level output along line 29. With a second level output along line 29, the voltage waveforming network remains disconnected from line 33 and the lenses 15' retain their transparent state.

An UPPER LENS DRIVER 41 houses a similar waveforming network which is connectable to line 43 for impressing a state-switching voltage waveform onto the upper lens portions 17' for driving the same to their opaque state.

When the upper lens portions 17 are opaque, they may be said to constrict the concerned peripheral-view-direction (in this case upper) to an easily determined line of sight (established by line 19) so as to properly locate the position sensor 25, and secondly, to constrict the peripheral viewing along this peripheral-view-direction to an extent such that the wearer can comfortably direct his vision to the instrument panel of his craft while having his upper peripheral vision checked to a point to prevent him from viewing out over the control panel without a corresponding upward movement of his head.

The lower lens portions 15' form a voltage controlled, bistate lens system having a first stable state of transparency, and a second stable state of opacity. The LOWER LENS DRIVER 31 serves to control the state of the lower lens system according to a voltage input along line 29.

A keyboard control box 37 is provided for use by a copiloting instructor to operate the flight glasses when worn by a student-pilot. The control box 37 includes a liquid crystal display 39 connected in parallel with the upper and lower lens systems of the eyeglasses 11 for conjoint operation therewith. The display 39 includes a visual display of both the upper and lower lens portions of the student's flight glasses and may have fixed indicia placed below the liquid crystal display 39 to permit the operator to easily determine when the student's lenses are clear and opaque.

The keyboard control box 37 includes a plurality of toggle switches 45-50 which serve as control devices, permitting the copilot-instructor to operate the student's flight glasses during actual flight. Any suitable switching components may be utilized other than a toggle-type switch to perform the method of the present invention; the switches 45-50, however, will be described herein as two-positional toggle switches.

A VFR/IFR switch 45 is utilized to control the glasses to either a VFR mode (visual flight rules) or an IFR mode (instrument flight rules). With the switch 45 in the VFR position, both lens systems and side lenses 23' are placed in their transparent state and the position sensor 25 is disabled from affecting the lower lens system 15, such that the glasses 11 assume the role of a normal pair of eyeglasses. With the switch 45 in the IFR mode position, the upper lens system 17 and side lenses 23' are driven to their opaque state and the switching system 27 is enabled to affect the lower lenses 15' such that the flight glasses 11 are transferred to an instrument training mode.

With the glasses 11 in the VFR mode, the instructor is able to talk to the student without the student having to raise his head to view out through the lower lens portions 15', as would be necessary if the upper lens portions were permanently opaque. Landing is also facillitated when the glasses are in the VFR mode, in that the student has full vision through the upper and side lens portions, and need not remove the glasses during a landing approach.

The VFR/IFR switch 45 also permits the instructor to simulate an immediate entrance of the craft into a cloud structure, or the like. By operation of switch 45 from a VFR mode to an IFR mode during inflight operation, the student-pilot's glasses are immediately fogged, and the student must begin instrument flying as he can only view the instrument control panel.

In operation, the switch 45 may communicate with the electrical circuitry of the system in a number of ways as will suggest itself to persons skilled in the art, to perform its above-described control function. For example, the control box 37 may house the power supply for the electrical circuitry of the system. The switch 45 may merely connect or disconnect the power supply to the whole circuitry of the system when switching between IFR and VFR modes. On the other hand, the switch 45 may merely connect or disconnect the UPPER LENS DRIVER 41 to the output line 43 which feeds the upper and side lens systems, and connect or disconnect the LOWER LENS DRIVER 31 to the input line 29 to enable or disable its communication with the position sensor 25.

The VFR/IFR switch 45, however, presents a potential danger. When the glasses are in a VFR mode and the student pilot is in the midst of landing the craft, an inadvertent switching of switch 45 to the IFR position would cause an immediate fogging of the glasses, blocking the pilot from viewing outside the craft during his landing approach. This could be fatal since instruments are practically useless during landing touchdown. To overcome this potential danger, an APPRO/T.O. switch 47 and a MASTER switch 50 are utilized on the control box 37 for locking the VFR/IFR switch in its VFR mode during a landing approach.

The APPRO/T.O. switch 47 is moved to its APPRO position (approach mode) during a landing approach. The upper lens system 17 and side lenses 23' are driven to their transparent state and the glasses enter a VFR mode for approach landing.

With the switch 47 in the APPRO position, the VFR/IFR switch 45 is disabled so that the lenses will not refog in the event that the switch 45 is switched from the VFR position to the IFR position. The only way to refog the glasses to their IFR mode is by use of the MASTER switch 50.

The MASTER switch 50 is positioned on the side of the control box 37 and is actuable for turning on the control box to enable all of the control switches 45-49 into working operation. When the MASTER switch 50 is in its OFF position all controlling switches are disabled and the glasses resume a VFR mode. As the MASTER switch 50 is switched from its OFF position to its ON position, the switches 45 and 47 are reset; the switch 45 resets to its VFR position and the switch 47 resets to its T.O. position.

Thus, as the MASTER switch is turned on, the glasses enter the VFR mode and the switch 47 is reset to its T.O. position. Once the switch 47 is moved to its APPRO position, the glasses cannot enter an IFR mode via switch 45 unless the MASTER switch is moved to its OFF position disabling all switches (the glasses still in a VFR mode), then the MASTER switch is moved to its ON position which resets the APPRO/T.O. switch thus unlocking the VFR/IFR switch (the glasses still in a VFR mode) and finally the switch 45 may be moved to the IFR mode for fogging the lenses.

Therefore, after the copilot-instructor has switched to the approach mode, the MASTER switch 50 must be toggled to OFF and then back to ON before the glasses are permitted to enter the IFR mode via switch 45. Such a switching feature, prevents the copilot from inadvertently causing the VFR/IFR switch 45 to move to its IFR position and fog the lenses during a landing approach.

The MASTER switch 50 may cooperate with switches 45 and 47 in a number of ways, as will suggest itself to persons skilled in the art, to produce the above-described control function. For example, where mechanical switches are utilized as switches 45 and 47, solenoids may be arranged for driving the switches 45, 47 to their respective reset positions when MASTER switch 50 is moved from its OFF position to its ON position. Also, where electrical switches such as solid state relays are used as switches 45, 47, a single-pulse generator may be activated by MASTER switch 50 moving from its OFF position to its ON position, for resetting the relay switches 45, 47.

The APPRO/T.O. switch 47 may cooperate with switch 45 in a number of ways as will suggest itself to persons skilled in the art, to produce the above described control function. For example, once the switch 47 is moved to its APPRO position it cannot be switched back to its T.O. position; only the MASTER switch 50 can reset switch 47 to its T.O. position. Also, when switch 47 is moved to its APPRO position the VFR/IFR switch is electrically disconnected, and with movement of the APPRO/T.O. switch to its T.O. position by operation of the MASTER switch 50, the VFR/IFR switch is electrically reconnected to working operation.

Also, the use of the MASTER switch 50 may be eliminated, and only switches 45 and 47 utilized to provide a double-action requirement to refog the lens systems.

For example, the VFR/IFR switch 45 may be used only for supplying power to the system. When in the VFR switch position, no power is applied to the circuitry system. When switch 45 is moved to the IFR position power is applied but the glasses remain in a transparent mode. With switch 45 in its IFR position, movement of switch 47 to the T.O. position causes the glasses to fog to their training mode. Then, on landing approach, the movement of switch 47 to the APPRO position causes a resetting of switch 45 to its VFR position which in turn causes a clearing of the lenses for landing. Now in order to refog the glasses two switches must be manipulated, switch 45 must be moved to its IFR position and switch 47 must be moved to its T.O. position.

In the preferred embodiment, the APPRO/T.O. switch 47 also performs a separate controlling function of initiating operation of a % opacity generator 53 within the flight glasses control circuitry.

The % opacity generator is associated with the LENS DRIVERS 31, 41 for varying the light transmissiveness of the lenses 16 over a time duration when switching between a transparent state and a fully opaque state. The % opacity generator applies a gradually increasing or decreasing voltage level to the lenses instead of an immediate voltage switching-magnitude to the lenses, to gradually change the lens from one of its states to the other. The preferred mode provides a 10 second duration between change of states.

Thus, when the student pilot is making an approach to land the craft, the switch 47 is moved to its APPRO position. The upper lenses 17' and side lenses 23' gradually clear to their transparent state, and the lower lens driver, if initiated along line 29, applies only the voltage waveform as produced by operation of the % opacity generator 53. The glasses thus enter a VFR mode.

With the switch 47 in the T.O. position (take-off mode), the lenses are commanded to gradually fog when switch 45 is moved to its IFR position. Thus, on take-off, the instructor can command a gradual fogging, to simulate flight up through cloud structures. The upper lenses 17' and side lenses 23' gradually fog closing the student's side and upper perpheral vision as he views the control panel through the lower lenses 15'. As the student views outside the cockpit, the LOWER LENS DRIVER 31 instantly fogs the lower lenses 15' to the present opacity level of the upper and side lenses, and the lower lenses 15' continue to fog in synchronism with the upper and lower lenses. Thus, the glasses are able to simulate flight up through cloud structures, while having the distinct advantage of permitting the pilot to look back into the cockpit and view his instruments clearly.

In a similar manner when the switch 47 is switched to its APPRO position, the lenses are commanded to gradually clear to a VFR mode. Thus, on landing approach the instructor can command a gradual clearing of the lenses to simulate landing through cloud structures. The upper lenses 17' and side lenses 23' gradually clear, opening the student's side and upper peripheral vision as he views the control panel through the lower lenses 15'. As the student views outside the cockpit, the LOWER LENS DRIVER instantly drives the lower lenses 15' to the present opacity level of the upper and side lenses, and the lower lenses 15' continues to clear in synchronism with the upper and lower lenses. Thus, the glasses are able to simulate landing through cloud structures, while having the distinct advantage of permitting the pilot to look back into the cockpit and view his instrument clearly.

Thus, the copilot instructor initially turns the MASTER switch to ON, enabling the control box 37. The glasses are in their VFR mode and switch 47 is in its T.O. position. As switch 45 is placed in its IFR position, the T.O. switch enables the opacity generator 53 causing the upper and side lenses 17', 23' to gradually fog preparing the glasses for instrument training. The gradual fogging can be actuated by the instructor during take-off for simulating the above-described flight up through cloud structure, if the instructor so desires.

After having once gradually fogged the glasses in the T.O. switch position, the VFR/IFR switch becomes operable for immediate clearing and fogging of the lenses to simulate immediate entrance into cloud structures as previously described. In order to simulate a gradual fogging again, the MASTER switch 50 must be toggled to initialize the glasses.

Thus, the LENS DRIVERS 31, 41 are operable for either impressing a normal-operation, state-switching voltage waveform onto its respective lenses or impressing a % opacity waveform from generator 53 onto its respective lenses. Either the state-switching voltage waveform or the % opacity voltage waveform is connected to output lines 33, 43 according to commands by the control box 37.

For example, movement of switch 47 to the APPRO position connects a decreasing voltage waveform from opacity generator 53 onto line 43, and onto line 33 according to controlling line 29. With switch 47 initially in the T.O. position, movement of switch 45 to the IRF position connects an increasing voltage waveform from opacity generator 53 onto line 43, and onto line 33 according to controlling line 29. However, once switch 45 is moved back to its VFR mode, the opacity generator 53 is disabled until switch 47 is moved to the approach mode or MASTER switch 50 is toggled.

Four bispositional switches, indicated by numberal 49, are positioned on the control box 37 for commanding a discrete level of opacity to be impressed upon the lens systems by the % opacity generator 53. The four switches 49 are denominated $\frac{1}{4}$, $\frac{1}{2}$, 182 and 1, and refer to miles of visibility. Each of the four switches selects a discrete level of voltage application from the opacity generator for fogging the lenses such that the student will have either a $\frac{1}{4}$ mile, $\frac{1}{2}$ mile, $\frac{3}{4}$ mile or 1 mile visibility therethrough. The selected voltage waveform replaces the state-switching voltage waveform and the flight glasses are operable in the instrument training mode as described above for permitting the pilot to view the instrument control panel through transparent lenses 15'.

The % opacity generator 53 may comprise measured resistors corresponding to respective miles-of-visibility for transferring the voltage switching waveform of LENS DRIVERS 31, 41 to a percentage of its normal amplitude, or the opacity generator 53 may comprise four separate voltage waveform generators, each corresponding to a particular miles-of-visibility. Also, for performing the gradual increase or decrease in lens opacity, the % opacity generator 53 may for example, comprise a ramp generator or other waveform generator for producing a gradual increasing or decreasing voltage waveform.

In order to simulate aircraft flight through broken cloud structures, a SCUDD/SOLID switch 46 is utilized to actuate a scudd generator 51 for randomly flashing the lenses 16 on and off. With switch 46 in the SCUDD position, the scudd generator 47 cooperates with the LENS DRIVERS 31, 41 for randomly connecting and disconnecting the LENS DRIVERS' output along lines 33, 43 for flashing the lens systems 15, 17 and side lenses 23'.

The upper lenses 17' and side lenses 23' flash on and off as the student pilot views the control panel through the lower lenses 15'. As the student views outside the cockpit, the LOWER LENS DRIVER 31 instantly begins flashing the lower lenses 15' in synchronism with the upper and side lenses. Thus, the glasses are able to simulate flight through cloud structures, while having the distinct advantage of permitting the pilot to look back into the cockpit and view his instruments clearly.

The scudd generator 47 may include an oscillator for producing a pulse output to open and close a switch connecting the LENS DRIVERS 31, 41 to their respective output lines 33, 43. The output of the oscillator is randomly varied by varying either the frequency or the time period of the oscillating waveform.

The scudd generator output need not be a truly random pulse switching output, however it should be a nonuniform pulse switching output, i.e. one not having a regular repetition rate. This is so to prevent the student pilot from learning the "ryhthm" of the switching for only viewing outside the craft during the transparency.

For example, the scudd generator 51 may comprise three different pulse generators, each for producing 1 second width pulses at different spacings and all generator outputs ORed together to provide a switching signal. Specifically, one generator could provide a pulse every 10 seconds, another generator providing a pulse every 14 seconds and the third generator providing a pulse ever 18 seconds. The pulse switching output would then be a 1 second pulse at 10 seconds, 14, 18, 20, 28, 30, 36, etc.

With the switch 46 in the SOLID position, the scudd generator is disconnected from the circuitry and the glasses function with solid opaque states as previously described.

A DAY/NIGHT switch 48 may be positioned on the control box 37 for controlling the switching system 27. As previously described in the above-referenced application, Ser. No. 768,851 when using a light phenomenon sensing system for the relative position sensor 25, the inputs to the switching system may be reversed for use during actual night flying. A higher intensity of light will come from the lighted instrument panel at night as compared to the low light level outside the craft.

The DAY/NIGHT switch 48 serves to reverse the sensing mode of the switching system 27 for operation of the sensor 25 either during daylight or at night.

It should be understood, of course, that the foregoing disclosure relates to preferred embodiments of the invention and that other modifications or alterations may be made therein without departing from the spirit or scope of the invention as set forth in the appended claims.

What is claimed is:

1. Flight training apparatus operable for preventing a pilot from viewing out through the windshield of his aircraft, comprising:
   voltage controlled lens means having a first state of transparency permitting visual communication therethrough, and operable to a second state of opacity for blocking visual communication;
   means for suitably securing said lens means in a transverse relationship with respect to lines of sight of a pilot;
   vision checking means actuable responsive to an electrical signal for checking the pilot's vision through said lens means with respect to a peripheral-view-direction to a predetermined line of sight to engage movement of the pilot's head for a greater peripheral viewing along said peripheral-view-direction;
   means selectably actuable for producing said electrical signal for actuating said vision checking means;
   means for monitoring the relative position of said predetermined line of sight with respect to the windshield, said means indicating when said predetermined line of sight passes through the windshield; and
   electrical circuitry means cooperable with said monitoring means for actuating said lens means to said second state responsive to said monitoring means indicating said predetermined line of sight is passing through said windshield, said lens means otherwise remaining in said first state.

2. Apparatus according to claim 1 wherein said actuable vision checking means includes a voltage controlled second lens means having a first state of transparency permitting visual communication therethrough, and operable to a second state of opacity for blocking visual communication for checking the pilot's vision to said peripheral-view-direction.

3. Apparatus according to claim 2 and further including side blinder means for blocking side peripheral vision of the pilot, said side blinder means including a voltage controlled third lens means having a first state of transparency permitting visual communication therethrough, and operable to a second state of opacity for blocking side peripheral vision.

4. Apparatus according to claim 2 and further including manual switching means operable for maintaining said lens means and said second lens means in said transparent state despite said monitoring means indicating said predetermine line of sight passing through the windshield; and interlock means operable for preventing disoperation of said switching means.

5. Apparatus according to calim 2 and further including means for gradually increasing opacity of said second lens means over a prefixed time for switching between said first state and said second state for simulating flight through cloud structures, said gradual increasing opacity means cooperating with said electrical circuitry means for gradually increasing opacity of said lens means responsive to said monitoring means indicating said predetermined line of sight passing through said windshield, said gradual increasing opacity means affecting said second lens means in opacity correspondence with said lens means.

6. Apparatus according to claim 2 and further including means for gradually decreasing opacity of said second lens means over a prefixed time for switching between said second state and said first state for simulating flight through cloud structures, said gradual decreasing opacity means cooperating with said electrical circuitry means for gradually decreasing opacity of said lens means responsive to said monitoring means indicating said predetermined line of sight passing through said windshield, said gradual decreasing opacity means affecting said second lens means in opacity correspondence with said lens means.

7. Apparatus according to claim 1 and further including means for nonuniformly, continually actuating said checking means for continually checking the pilot's vision through said lens means for simulating flight through cloud structures, said nonuniform continual actuating means cooperating with said electrical circuitry means for continually actuating said lens means to said second state responsive to said monitoring means indicating said predetermine line of sight passing through said windshield, said nonuniform continual actuating means actuating said lens means in synchronism with said checking means.

8. Flight training apparatus operable for preventing a pilot from viewing out through the windshield of his aircraft, comprising:
   voltage controlled first lens means having a first state of transparency permitting visual communication therethrough, and operable to a second state of opacity for blocking visual communication;
   voltage controlled second lens means having a first state of transparency permitting visual communication therethrough, and operable to a second state of opacity for blocking visual communication, said first and second lens means disposed contiguous to each other;
   means for suitably securing said first and second lens means in a transverse relationship with respect to lines of sight of a pilot, said first lens means disposed with respect to a peripheral-view-direction of the pilot;
   means for selectably actuating said first lens means to said second state for checking the pilot's vision through said second lens means to a predetermined line of sight defined by the contiguous relationship of said first and second lens means to engage movement of the pilot's head for a greater peripheral viewing along said peripheral-view direction;
   means for monitoring the relative position of the predetermined line of sight with respect to the windshield, said means indicating when said predetermined line of sight passes through the windshield; and
   electrical circuitry means cooperable with said monitoring means for actuating said second lens means to said second state responsive to said monitoring means indicating said predetermined line of sight passing through said windshield, said second lens means otherwise remaining in said first state.

9. Apparatus according to claim 8 and further including side blinder means for blocking side peripheral vision of the pilot, said side blinder means including a voltage controlled third lens means having a first state of transparency permitting visual communication therethrough, and operable to a second state of opacity for blocking side peripheral vision.

10. Apparatus according to claim 9 wherein said selectably actuating means actuates said third lens means to said opaque state conjointly with actuation of said first lens means to said opaque state.

11. Apparatus according to claim 8 and further including means operable for nonuniformly, continually actuating said first lens means to said second state for continually checking the pilot's vision through said second lens means for simulating flight through cloud structures, said continual actuating means cooperating with said electrical circuitry means for nonuniformly, continually actuating said second lens means to said second state responsive to said monitoring means indicating said predetermined line of sight passing through said windshield, said nonuniform continual actuating means actuating said second lens means in synchronism with said first means.

12. Flight training apparatus operable for affecting a pilot's vision out through the windshield of his aricraft, comprising:
   voltage controlled lens means having a first state of transparency permitting visual communication therethrough and operable to a second state of percentage opacity for affecting visual communication, said second state of percentage opacity for simulating distance of visibility to the pilot;
   means for suitably securing said lens means in a transverse relationship with respect to lines of sight of a pilot;
   vision checking means for checking the pilot's vision through said lens means with respect to a peripheral-view-direction to a predetermined line of sight to engage movement of the pilot's head for a greater peripheral viewing along said peripheral-view-direction;
   means for monitoring the relative position of said predetermined line of sight with respect to the windshield, said means indicating when said predetermined line of sight passes through said windshield; and
   electrical circuitry means cooperable with said monitoring means for actuating said lens means to said second state responsive to said monitoring means indicating said predetermined line of sight is passing through said windshield, said lens means otherwise remaining in said first state, whereby a flight training apparatus is provided operable to affect the pilot's visual communication when the pilot views outside the craft to simulate distance of visibility, and operable to unobstructed clear visual communication as the pilot turns to view the instrument control panel of his craft.

13. Apparatus according to claim 12 wherein said vision checking means includes a voltage controlled second lens means having a state of percentage opacity equal to the percentage opacity of said second state.

14. Apparatus according to claim 12 and further including means for varying the percentage opacity of said second state.

15. Flight training apparatus operable for affecting a pilot's vision through the windshield of his aircraft, comprising:
   voltage controlled lens means having a first state of transparency permitting visual communication therethrough, and operable to a second state of opacity for blocking visual communication;

means for suitably securing said lens means in a transverse relationship with respect to lines of sight of a pilot;

vision checking means for checking the pilot's vision through said lens means with respect to a peripheral-view direction to a predetermined line of sight to engage movement of the pilot's head for a greater peripheral viewing along said peripheral-view direction;

means for monitoring the relative position of said predetermined line of sight with respect to the windshield, said means indicating when said predetermined line of sight passes through said windshield;

electrical circuitry means cooperable with said monitoring means for actuating said lens means to said said second state responsive to said monitoring means indicating said predetermined line of sight is passing through said windshield, said leans means otherwise remaining in said first state; and means cooperating with said electrical circuitry means, for nonuniformly, continually actuating said lens means to said second state responsive to said monitoring means indicating said predetermined line of sight is passing through said windshield, whereby a flight training apparatus is provided operable to affect the pilot's visual communication when the pilot views outside the craft to simulate flight through cloud structures and operable to unobstructed clear visual communication as the pilot turns to view the instrument panel of his craft.

* * * * *